(12) United States Patent
Pierron et al.

(10) Patent No.: US 12,072,123 B2
(45) Date of Patent: Aug. 27, 2024

(54) FRAME FOR AN ELECTRIC HEATING DEVICE, COMPRISING AN ELASTICALLY DEFORMABLE ELEMENT

(71) Applicant: Valeo Systemes Thermiques, Le Mesnil-Saint-Denis (FR)

(72) Inventors: Frèdèric Pierron, Le Mesnil Saint Denis (FR); Serif Karaaslan, Le Mesnil Saint Denis (FR); Pascal Fourgous, Le Mesnil Saint Denis (FR); Yann Couapel, Le Mesnil Saint Denis (FR); Romain Delcourt, Le Mesnil Saint Denis (FR); Laurent Tellier, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 881 days.

(21) Appl. No.: 16/970,509

(22) PCT Filed: Feb. 11, 2019

(86) PCT No.: PCT/FR2019/050291
§ 371 (c)(1),
(2) Date: Aug. 17, 2020

(87) PCT Pub. No.: WO2019/158844
PCT Pub. Date: Aug. 22, 2019

(65) Prior Publication Data
US 2021/0116147 A1 Apr. 22, 2021

(30) Foreign Application Priority Data
Feb. 19, 2018 (FR) ...................................... 1851386

(51) Int. Cl.
*F24H 3/04* (2022.01)
*B60H 1/22* (2006.01)
*F24H 9/1863* (2022.01)

(52) U.S. Cl.
CPC ......... *F24H 3/0458* (2013.01); *B60H 1/2225* (2013.01); *F24H 9/1872* (2013.01); *H05B 2203/02* (2013.01); *H05B 2203/023* (2013.01)

(58) Field of Classification Search
CPC .... F24H 3/0458; F24H 3/0476; F24H 3/0429; F24H 9/1872; B60H 1/2225;
(Continued)

(56) References Cited

U.S. PATENT DOCUMENTS

2009/0020515 A1* 1/2009 Clade .................... F24H 3/0435
219/202
2024/0098846 A1* 3/2024 Kräck et al. ........ H05K 7/20918

FOREIGN PATENT DOCUMENTS

DE 102012106157 A1 * 1/2014 ............. B21D 11/07
DE 102020000751 A1 * 8/2021
(Continued)

OTHER PUBLICATIONS

International Search Report and Written Opinion of corresponding International Application No. PCT/FR2019/050291, mailed May 7, 2019 (11 pages).

*Primary Examiner* — Shawntina T Fuqua
(74) *Attorney, Agent, or Firm* — Osha Bergman Watanabe & Burton LLP

(57) ABSTRACT

The invention relates to a frame (3) for an electric heating device (1), comprising at least one housing (7) intended to receive a heating element (5), said housing being defined by a plurality of longitudinal walls (23, 25) forming an insertion path for a heating element, and said insertion path being defined longitudinally by a back wall extending opposite an opening through which the heating element can be inserted (Continued)

into the housing. According to the invention, at least one of the longitudinal walls comprises a displacement reducing element (10) projecting from the wall. The displacement reducing element (10) comprises a ramp (11) that slopes gradually into the housing, towards the opposite longitudinal wall, said displacement reducing element (10) being arranged such that the downstream end (14, 15) thereof extends at a distance from the back wall (21).

9 Claims, 2 Drawing Sheets

(58) Field of Classification Search
CPC ........ B60H 2001/2278; H05B 2203/02; H05B 2203/023; H05B 3/84
See application file for complete search history.

(56) References Cited

FOREIGN PATENT DOCUMENTS

| | | | | |
|---|---|---|---|---|
| EP | 1462733 | A1 * | 9/2004 | ........... F24H 3/0405 |
| EP | 1564503 | A1 | 8/2005 | |
| EP | 2797382 | A1 * | 10/2014 | ........... B60H 1/2221 |
| FR | 2954469 | A1 * | 6/2011 | ........... F24H 3/0405 |

* cited by examiner

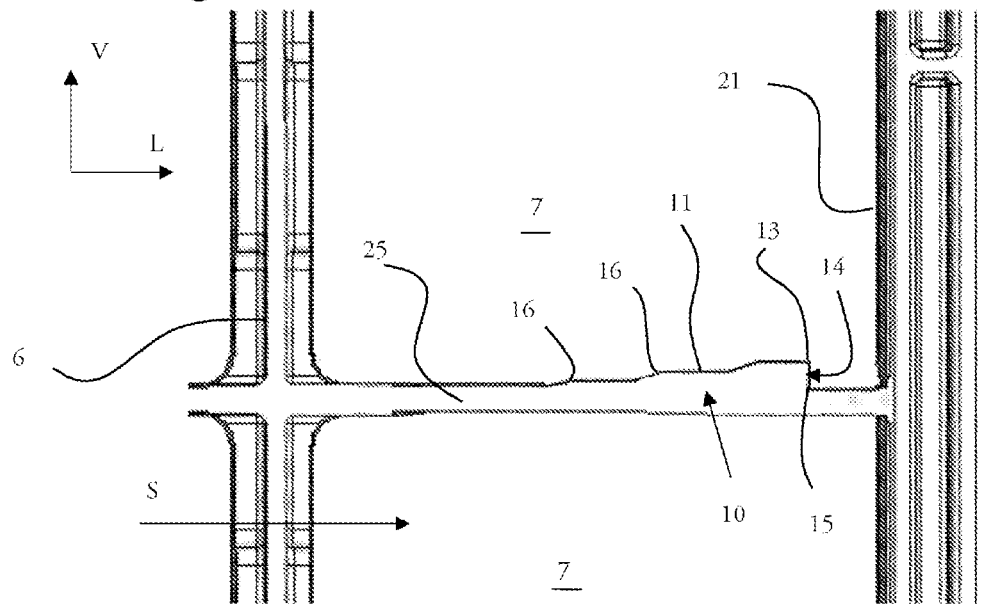
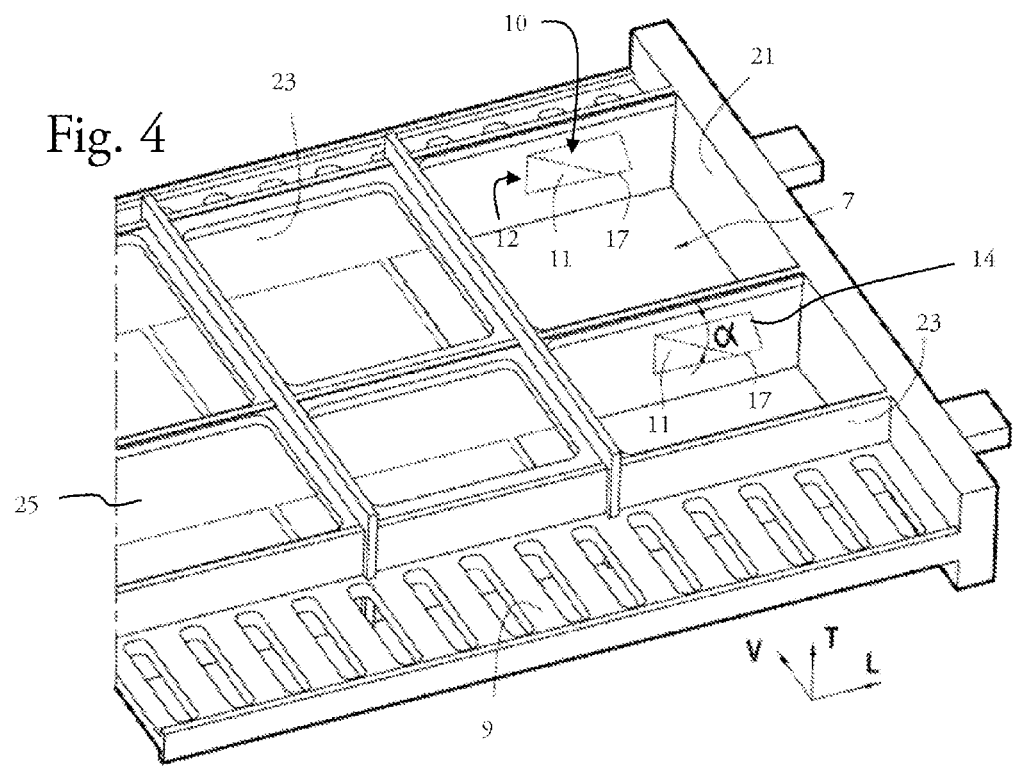

FRAME FOR AN ELECTRIC HEATING DEVICE, COMPRISING AN ELASTICALLY DEFORMABLE ELEMENT

The invention relates to electric heating devices, in particular for a ventilation, heating and/or air conditioning installation of a motor vehicle.

The air intended to heat the interior of a motor vehicle, and for demisting and defrosting glazed surfaces, is heated by heat exchange between an air flow and an engine coolant circulating in a heat exchanger.

When the engine is started and for a certain period after the starting time, the heat energy transported by the engine coolant is insufficient to ensure rapid and effective heating of the air that is blown into the vehicle interior. This is observed more particularly with certain types of engine and exhibits a drawback in cold weather, since not only can the internal temperature of the vehicle interior not be increased rapidly, but also the functions of demisting and defrosting cannot be ensured effectively.

In order to remedy these drawbacks, it has been proposed to fit an additional electric heating device in the air flow directed toward the vehicle interior.

Such an electric heating device generally comprises a frame having a heating unit comprising a plurality of parallel conductive plates, between which heating resistive elements are fitted, for example positive temperature coefficient (PTC) resistors, and radiant elements that increase the area for heat exchange with the air flow passing through the heating device.

These different elements are assembled so as to form at least one heating element, the constituent heating element(s) of the heating unit then being inserted into a housing therein. To this end, the housing, defined by walls, has resilient elements formed by tongues that are inclined with respect to the walls from which they are hinged, so as to be disposed in the housing and the insertion path when the heating element is fitted. These resilient tongues are thus stressed during the insertion of the heating element(s) and they therefore exert an elastic return force that helps to push the corresponding heating element toward the opposite wall of the housing. This ensures a reduction in displacement of the heating element in its housing, which has to be provided with dimensions much greater than those of the heating element in order to allow the latter to be inserted.

The drawback associated with the use of these resilient elements exerting a return force on the heating elements lies in the fact that, when the vehicle is running, or if the heating device drops, the resilient elements are subjected to more or less significant vibrations. These vibrations can bring about noise in the ventilation circuit serving the vehicle interior, and this can be bothersome to the users of the motor vehicle. It is also possible for these vibrations to weaken or break the resilient elements, the heating elements then no longer being held correctly in their housing, and this, too, can at least bring about bothersome noise for the users or contribute toward mechanical breakage of the heating elements.

In this context, the invention aims to propose an alternative to the known frames for additional electric heating devices, which is at least as effective and reliable.

To this end, the invention proposes a frame for an electric heating device for heating an air flow circulating inside a ventilation, heating and/or air conditioning installation of a motor vehicle, said frame comprising at least one housing intended to receive at least one heating element, the housing being delimited by a plurality of longitudinal walls forming a longitudinal insertion path for a heating element. The insertion path is delimited longitudinally by an end wall that extends on the opposite side from an opening through which it is possible to insert the heating element intended to be located in the housing, an insertion direction being defined from the opening to the end wall. According to the invention, at least one of the longitudinal walls of the housing comprises a displacement reducing element protruding from said wall, said displacement reducing element having a ramp extending progressively toward the interior of the housing with respect to the insertion direction, toward the opposite longitudinal wall, said displacement reducing element being arranged such that its downstream end extends at a distance from the end wall.

Thus, the invention affords an alternative for keeping the heating elements in a heating device. The presence of a displacement reducing element having a ramp makes it possible to keep the heating element in the housing by compensating for the clearance that exists between the heating element and the housing, regardless of the size of the clearance, without requiring insertion forces that are too high. Compensating for the clearance is understood as meaning that the displacement reducing element is configured to come into contact with the heating element. The fact that the downstream end extends at a distance from the end wall provides flexibility in this contact zone, making it possible, there too, to reduce the insertion forces to be applied and to avoid deformation of the heating element when the latter comes into contact with the displacement reducing element. As a result, the performance of the heating elements is not impaired.

The ramp shape of the displacement reducing element makes it possible to progressively guide the heating element, as it is being inserted, in the direction of the opposite longitudinal wall. This ramp shape extends from the upstream end of the displacement reducing element, that is to say the end that is covered first by the heating element as it is being inserted, which is located in the plane of the longitudinal wall. The downstream end, at a distance from the end wall, may correspond to the apex of the displacement reducing element, that is to say the innermost point in the housing.

Provision may be made for the downstream face of the displacement reducing element, that is to say a face linking the apex of this element to the longitudinal wall, in the direction of the end wall, to be substantially perpendicular to the longitudinal wall and parallel to the end wall.

According to one or more features that can be considered on their own or in combination, the following may be provided:

- The displacement reducing element is situated on a median plane of the frame, and thus of the housing in which it extends. This ensures, regardless of the width of the displacement reducing element, that the position of the heating element in the housing is balanced.
- The longitudinal wall comprises a plurality of displacement reducing elements. In this way, the heating element can be in contact with such elements at several locations and the position thereof in the housing can be all the more stable.
- The longitudinal walls defining the housing each comprise at least one displacement reducing element.
- The displacement reducing elements are disposed alternately on a first longitudinal wall and on a second longitudinal wall. The term "alternately" is understood as meaning for example that the displacement reducing elements on the first longitudinal wall do not share the transverse axes of the displacement reducing elements situated on the second longitudinal wall. The offset can be constant. It will be understood that this feature is also applicable when there is only one displacement reducing element on each of the longitudinal walls.

The displacement reducing element has an inclined surface forming a ramp, said inclined surface exhibiting an inclination angle with respect to the longitudinal wall on which the displacement reducing element is situated.

The displacement reducing element has at least one protruding ridge that is arranged in the continuation of the inclined surface and forms the apex of the displacement reducing element, this apex ridge being the innermost part of the displacement reducing element in the housing. As a result, this ridge is a part of the displacement reducing element that is able to always be in contact with the heating element as the latter is being inserted, regardless of the manufacturing clearances of the frame and of the heating element.

The downstream end of the displacement reducing element has a downstream face substantially parallel to the end wall. One edge of this downstream face, on the opposite side from the longitudinal wall that it meets, forms the protruding ridge at its junction with the inclined surface forming a ramp.

The displacement reducing element is in a zone defined between the end wall and a central part of the housing relative to its longitudinal dimension. Provision may be made for the downstream end of the displacement reducing element to be arranged at a longitudinal distance of between 10 and 30 millimeters from the end wall. As a result, the downstream end is far enough from the end wall to allow, if necessary, deformation of the part of the displacement reducing element in contact with the heating element, while remaining in a displacement reducing context at the end of insertion travel of the heating element, that is to say in the zone in which the heating element is most likely to be displaced.

The displacement reducing element is integral with the longitudinal wall on which the displacement reducing element is situated. Such a configuration makes the frame manufacturing operations easier, the displacement reducing element being able to be obtained in the same frame molding operation for example.

The displacement reducing element is produced independently of the frame and is then fixed to a longitudinal wall of this frame. Such a configuration makes it possible to produce the displacement reducing element from a different material than the one used for the frame, and thus to change the properties of the material so as not to damage the heating element when the displacement reducing element is in contact with the heating element for example.

The inclined surface has levels parallel to the longitudinal wall on which the displacement reducing element is situated. This ensures levels of forces during the insertion of the heating element into the housing.

The displacement reducing element extends from one edge to the other of the longitudinal wall on which the displacement reducing element is situated.

The invention also relates to an electric heating device comprising at least one heating element, characterized in that it comprises a frame as described above and in which the at least one heating element is disposed.

Said at least one heating element can be pushed into contact with the displacement reducing element, in the direction of the opposite wall to the longitudinal wall on which the displacement reducing element is situated.

Other features and advantages of the present invention will become more clearly apparent from the description and the drawings, in which:

FIG. 3 is a side view of a displacement reducing element according to an embodiment variant; and FIG. 4 is a perspective view similar to the one in FIG. 2, illustrating a second embodiment of the frame of the electric heating device.

It should first of all be noted that the figures set out the invention in detail and may of course serve to better define the invention if necessary. However, it should be noted that these figures only set out some of the possible exemplary embodiments of the invention.

In the following description, reference will be made to an orientation as per the longitudinal L, vertical V and transverse T axes, as defined by the trihedron L, V, T shown in the figures. The longitudinal axis L corresponds to the direction of extension of the frame of the electric heating device, the transverse axis T, perpendicular to the longitudinal axis L, corresponds to the direction followed by the air flow to be heated passing through the heating device, and the vertical axis V is perpendicular both to the longitudinal axis L and to the transverse axis T. It should be noted that the choice of designations of these axes does not limit the orientation that the electric heating device can adopt when applied to a motor vehicle.

Figure 1:
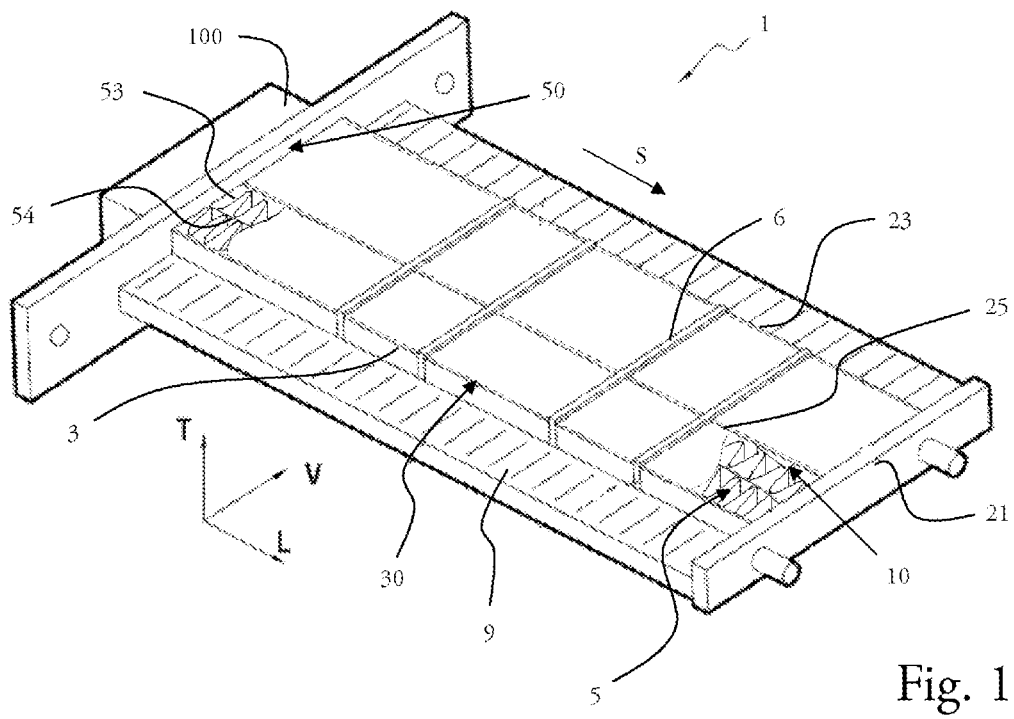
FIG. 1 is a perspective overall view of an electric heating device according to the invention, comprising a frame into which heating elements have been inserted and to one end of which an electrical connection interface is fixed.

The electric heating device 1 shown in FIG. 1 is intended to be housed in an air circulation duct of a ventilation, heating and/or air conditioning installation, so as to convert the electrical energy drawn from the vehicle into thermal energy given up to the air passing through this duct. The installation is not shown here, but it will be understood that a main duct of this installation has, in a conventional manner, an opening made in the wall for the insertion of the electric heating device 1.

FIG. 1 shows an electric heating device 1 according to the invention, comprising a frame 3 into which heating elements 5, which are able to convert an electric current into thermal energy, have been inserted. In order to compensate for the manufacturing clearances between the heating elements 5 and the frame 3, the frame 3 comprises displacement reducing elements 10, which will be described below.

The heating elements 5 comprise means that are able to exchange heat, such as radiant elements 53 for increasing the area for heat exchange, with the air flow passing through the electric heating device 1. The heating elements 5 also comprise electrodes 54, between which heating resistive elements, for example positive temperature coefficient (PTC) resistors, are disposed, and to which the radiant elements 53 are fixed. The electrodes 54 and the PTC resistors make it possible to convert an electric current into thermal energy. It should be noted that the positive temperature coefficient resistors can be bonded directly to the radiant elements 53.

The frame 3 has a heating compartment 30, forming a casing for receiving the heating elements 5, and a connection interface 100 provided at one of its ends. The heating elements are inserted into housings 7 (references visible in FIGS. 3 and 4) provided inside the heating compartment 30. The connection interface 100 closes an opening 50 through which the heating elements 5 are inserted into the housings 7 of the heating compartment 30, and at the same time allows the electric heating device 1 to be connected to an electrical network of the vehicle for supplying the heating elements 5 with electricity.

The frame 3 and the heating compartment 30 have a rectangular parallelepiped shape. The two main faces of the frame 3, at the front and rear, respectively, which are opposite one another along the transverse axis T, are perforated so as to allow the passage of an air flow and diffusion of heat in the duct in which the electric heating device 1 is installed. The frame 3 comprises a median plane corresponding to a plane that passes through a midway point of the frame and is perpendicular to a direction followed by the air flow circulating through the electric heating device 1. It will be understood that the front and rear faces of the frame 3 extend in planes parallel to the median plane.

Note also that the frame 3 comprises bars 9 disposed, in this case, at the periphery of the heating compartment 30. These bars 9 help to stiffen the frame 3 and comprise ventilation slots 90 allowing the air flow to circulate through. The ventilation slots 90 are positioned one after another along the longitudinal axis L of the heating device 1, it being understood that the shape and number of the air passages formed here by the slots do not limit the invention. As a result of the peripheral disposition of the bars 9, the housings 7 are next to one another.

The heating compartment 30 comprises a plurality of walls. Among these walls, there are longitudinal walls 23, 25 extending along the longitudinal axis L with two lateral longitudinal walls 23 and at least one intermediate longitudinal wall 25. The lateral longitudinal walls 23 delimit between one another a vertical dimension of the heating compartment 30, and the intermediate longitudinal walls 25 extend parallel to the lateral longitudinal walls 23 and inside the heating compartment 30 so as to define, between one another and with the lateral longitudinal walls 23, a plurality of housings 7 inside the heating compartment 30. Thus, each housing 7 of the frame 3 is delimited by walls. More specifically, each housing 7 is delimited vertically by two longitudinal walls 23, 25, which may be lateral 23 or intermediate 25. In the exemplary embodiment illustrated, the frame 3 comprises two housings 7 with an intermediate longitudinal wall 25.

For each housing 7, a lateral longitudinal wall 23 and the intermediate longitudinal wall 25 delimit, between one another and vertically, an insertion path for the heating element 5. The insertion path corresponds to the path taken by the heating element 5 as it is being inserted into the frame. The spacing between the longitudinal walls 23, 25 of one and the same housing 7 corresponds to the vertical dimension of the heating element 5, give or take manufacturing clearances.

Each housing 7 is also delimited by an end wall 21 extending in a vertical transverse plane. This end wall 21 is situated on the opposite side from the opening through which the heating elements 5 are inserted into the heating compartment 30. It should be noted that, in the exemplary embodiment illustrated, the heating elements 5 are inserted into the housings 7 along an insertion direction parallel to the longitudinal axis L. The insertion direction S, for its part, is defined from the opening to the end wall 21.

The frame 3 also comprises ribs 6 transversely delimiting the insertion path of the heating element 5 into the housing.

To this end, the ribs 6 extend at least between two longitudinal walls 23, 25 forming one and the same housing 7, and it should be noted that these ribs also have a stiffening role for the frame 3 and for the heating compartment 30. The spacing between two ribs 6 situated on either side of the insertion path along the transverse axis T corresponds to the transverse dimension of the heating element 5, give or take manufacturing clearances.

According to the invention, and in order to compensate for the manufacturing clearances between a heating element 5 and the walls delimiting the housing 7 receiving this heating element, the frame 3, and more particularly at least one longitudinal wall 23, used in defining a housing receiving a heating element, comprises at least one abovementioned displacement reducing element 10.

Figure 2:
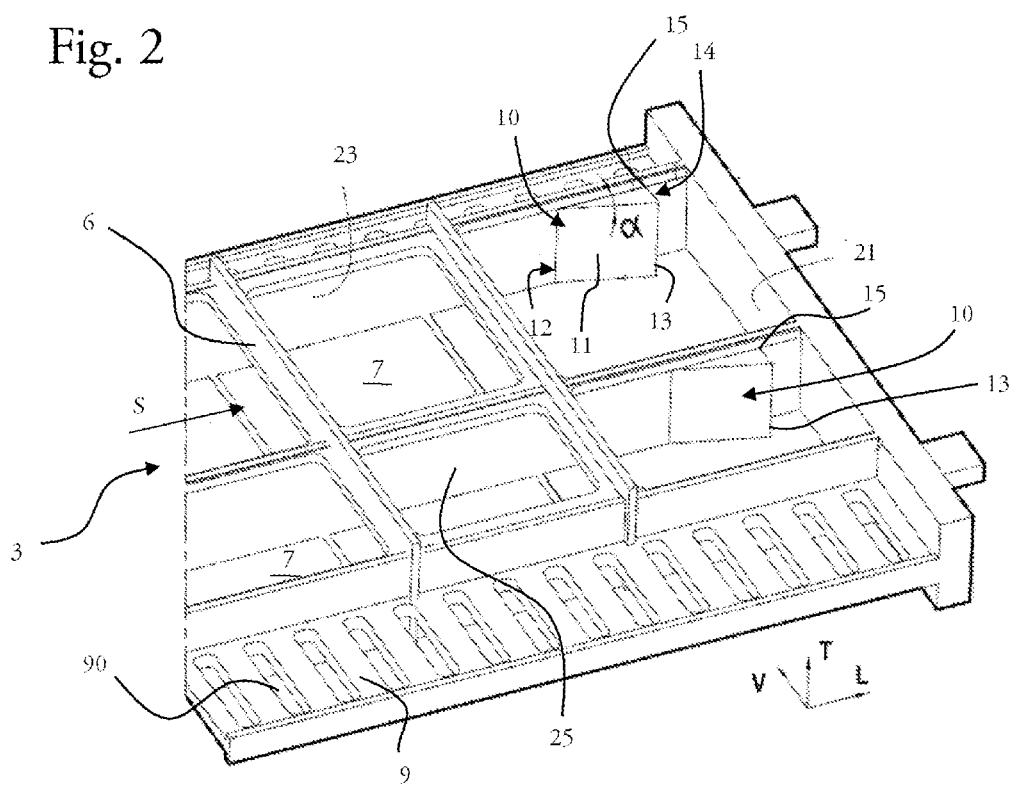
FIG. 2 is an enlarged view of a part of the frame of an electric heating device according to the invention, showing two displacement reducing elements equipping respective longitudinal walls used in forming the frame.

FIG. 2 illustrates the frame without the heating elements, in order to reveal two displacement reducing elements 10 that are arranged in respective housings 7, across the insertion path of the heating element intended to occupy this housing, each displacement reducing element being configured to have a downstream end at a distance from the end wall 21.

Each displacement reducing element 10 protrudes from a longitudinal wall 23, 25 and has an inclined surface 11 forming a ramp that extends progressively toward the interior of the housing 7, toward the opposite longitudinal wall. More particularly, the displacement reducing element 10 has a triangular shape in longitudinal section, that is to say in a longitudinal and vertical section plane.

The inclined surface 11 extends from an upstream end 12 of the displacement reducing element, away from the corresponding longitudinal wall, and toward the opposite longitudinal wall. More specifically, the inclined surface 11 forms an angle α with the longitudinal wall 23, 25 from which the displacement reducing element protrudes.

The ramp formed by this inclined surface extends in the continuation of the longitudinal wall and extends as far as an end edge forming an apex ridge 13, this end edge being the innermost part of the displacement reducing element in the housing and thus the part that is able to be in contact with the heating element, regardless of the manufacturing clearances.

In the example illustrated in FIG. 2, the ramp extends regularly and continuously from the upstream end 12 as far as the apex ridge 13, such that the force for inserting the heating element remains steady, without jolts that could be formed by an element without a ramp. Depending on the dimensions of the heating element, that is to say depending on the manufacturing clearances of this heating element and of the frame, it will be understood that the inclined surface will form an obstacle to the insertion of the heating element at its upstream end or at the apex ridge. In any case, the presence of this displacement reducing element tends to divert the heating element toward the opposite longitudinal wall and to fix the heating element in position in the frame, so as to reduce displacement of the components when the heating device is assembled. More particularly, and as is shown schematically in FIG. 1, the edges of the radiant elements 53 that are disposed facing this opposite longitudinal wall to the one bearing the displacement reducing element can be slightly compressed against the longitudinal wall, helping to fix the position of the heating element.

The displacement reducing element also comprises a downstream face 14, which links the apex ridge 13 to the longitudinal wall, downstream of the apex ridge, that is to say on the opposite side from the inclined surface 11 forming a ramp. In the example illustrated in FIG. 2 et seq., this downstream face 14 is straight and arranged in a vertical and transverse plane that furthermore comprises the apex ridge. As a result, the downstream face is perpendicular to the longitudinal wall and parallel to the end wall. It will be understood that, in a variant that is not shown, the downstream face could be inclined and have a vertical dimension that decreases progressively as far as the junction of the downstream end 15 with the longitudinal wall, provided that this junction with the longitudinal wall extends at a distance from the end wall as per the above-described feature of the invention.

Specifically, according to the invention, it is important that the displacement reducing element is not engaged with the end wall 21, which forms a stop surface for the movement in translation of the heating element, perpendicular to its insertion into the housing. The fact that the junction of the downstream end 15 of the displacement reducing element with one of the walls defining the housing is independent of the end wall allows flexibility of the displacement reducing element in its area of contact with the heating element and in particular at the apex ridge 13, which can collapse slightly under the force of insertion in the direction of the end wall 21 and thus, where appropriate, slightly reduce this insertion force to be applied, while correctly ensuring the function of reducing displacement without risking breakage of this element on account of its solid nature.

Since the displacement of the heating elements 5 inside the housings can be greater at their longitudinal ends close to the end wall, it is preferable for the displacement reducing elements to be situated in the vicinity of the end wall, and in particular in a zone defined between the end wall 21 and a central part of the housing 7 relative to the longitudinal dimension thereof.

Consequently, an advantageous configuration is illustrated in FIG. 2, in which the displacement reducing element acts in a zone of the frame that is particularly sensitive to these displacements, but without the drawback of being joined to the end wall and of the stiffness that would result therefrom. Furthermore, it may be noted that the free zone that is formed between the downstream face 14 and the end wall helps to lighten the frame.

Advantageously, the displacement reducing element is in a zone near the end wall, and in any case in the second longitudinal part of the frame, meaning, relative to this longitudinal dimension, between a central part of the housing and the end wall. Provision may be made for the downstream end of the displacement reducing element, namely the downstream face 14 or the junction of this downstream face with the longitudinal wall when the downstream face is not parallel to the end wall 21, to be arranged at a longitudinal distance of between 10 and 30 millimeters from the end wall. As a result, the downstream end is far enough from the end wall to confer, if necessary, a certain flexibility on the displacement reducing element, in particular at its apex ridge 13, while remaining in a displacement reducing context at the end of insertion travel of the heating element, that is to say in the zone in which the heating element is most likely to be displaced.

Furthermore, in terms of dimensions, the displacement reducing element 10 can have a length, measured along the longitudinal axis L, which may, for example, be between 10 and 15 mm.

It should be noted that the width of a displacement reducing element, the width being measured along the transverse axis T, can be different than the width of the displacement reducing element shown in FIG. 2. For example, the displacement reducing element can have a width equal to half the width of the longitudinal wall from which it extends, being centered transversely thereon.

Furthermore, the height of a displacement reducing element, the height being measured along the vertical axis V, can be around 1 to 10% of the height of the housing into which it extends. Preferably, the height of the displacement reducing element, measured along the vertical axis V, is between 0.5 and 1.5 millimeters and more particularly between 1 and 1.5 millimeters, knowing that the manufacturing clearance between the heating element 5 and the housing 7 is generally between 0.2 millimeter and 0.5 millimeter.

It should be noted that, when there are a plurality of displacement reducing elements on longitudinal walls defining one and the same housing, the sum of the heights of each of the displacement reducing elements is taken into consideration, in particular when these elements are disposed in the same zone of the housing, in order to ensure that the presence of the displacement reducing elements does not create a bottleneck that would increase the forces for insertion of the heating elements.

According to a first embodiment variant, illustrated in FIG. 3, the displacement reducing element differs from the above in that the inclined surface 11 forming the guide ramp for the heating element has levels 16, of which there are three here. These levels regularly interrupt the slope of the ramp and thus form interruptions to the increase in the force for inserting the heating elements into the housing. It will be understood that the number of levels could be different than that illustrated here, without otherwise departing from the context of this embodiment variant of the invention.

FIG. 4 illustrates a second embodiment of the invention, which differs notably in terms of the configuration of the upstream face forming a ramp.

This inclined surface 11 in this case has a triangular shape, consequently forming a protruding ridge 17 oriented toward the housing 7. The protruding ridge 17 is intended to come into contact with the heating element 5. Such a ridge makes it possible to bring about plastic deformation of the heating element, by piercing it if necessary. The protruding ridge 17 extends preferably in the insertion direction S of the heating element in the housing. Thus, in this case, the protruding ridge 17 extends along the longitudinal axis of extension of the longitudinal wall 23, 25 on which the displacement reducing element 10 is situated.

As before, the displacement reducing element has an inclined surface 11 forming an angle α with the longitudinal wall 23, 25 on which it is situated, and this displacement reducing element is configured to extend at a distance from the end wall, with a downstream end engaged with the longitudinal wall.

In each of the embodiments and embodiment variants presented above, the displacement reducing element 10 can be formed by an attached part, that is to say a part produced separately and then secured to the corresponding longitudinal wall, or it can be integral with the longitudinal wall 23, 25 of the housing 7, in particular by way of a single molding operation.

Of course, a combination of the different shapes and/or the different arrangements of the displacement reducing elements for one and the same frame 3, or even one and the same longitudinal wall, is possible.

The mounting of the electric heating device 1 comprising the frame 3 according to the invention will now be described.

Firstly, the heating elements 5 are inserted into the appropriate housings 7 inside the heating compartment 30. To this end, the heating elements 5 are inserted through the opening formed at one end of the frame 3, and the heating elements 5 are slid in translation toward the end wall 21 of the housing 7, in particular in the insertion direction indicated by the arrow S.

While it is being inserted into a housing equipped with at least one displacement reducing element, the heating element 5 comes into contact with the displacement reducing element arranged across the insertion path. This heating element 5 is then diverted from its initial straight trajectory, being pushed by the displacement reducing element in the direction of the opposite longitudinal wall to the one on which the displacement reducing element is provided. The fact that the displacement reducing element has a free downstream end, that is to say an end that extends longitudinally at a distance from the end wall, creates flexibility that allows slight deformation of the displacement reducing element at the ridge in contact with the heating element. As a result, the forces to be applied to push the heating element as far as the end wall, while it is also being pushed against a longitudinal wall by way of the displacement reducing element, are minimal.

The insertion of the heating element 5 continues until it meets the end wall 21 or some other mechanical end stop of the heating device.

Finally, the heating compartment 30 is closed by the connection interface 100. The connection interface 100 is then disposed at one end of the heating compartment 30 and makes it possible to connect the electric heating device 1 to an electrical network of the vehicle. The heating device 1 is then inserted into a duct of the heating/ventilation and/or air conditioning installation.

The above description clearly explains how the invention makes it possible to achieve the set objectives and in particular to provide a heating device 1 into which the heating elements 5 are easily inserted and in which they are not displaced inside their housing, using displacement reducing elements that are distinctive in that they have a ramp shape and in that their downstream end, namely the end reached last by the heating elements during the insertion thereof, is arranged at a distance from the end wall delimiting the insertion path. As will be apparent from reading the embodiments presented by way of example, these displacement reducing elements are optimized not only on account of their ramp shape, such that they allow diversion of the heating elements during the insertion thereof, by providing sufficient stiffness to effect this diversion and/or deformation and to avoid the risks of breakage when the heating device is manipulated, but also on account of their downstream end being configured not to extend as far as the end wall, which allows flexibility of the displacement reducing element, making it possible to limit the effect of the contact of the displacement reducing element with the corresponding heating element.

It should be noted that the displacement reducing element according to the invention is not a deformable element that returns to its original position by way of a return force, but a fixed element, the position of which within the housing is not altered by the passage of the heating element, with, if necessary, flexibility created locally at the ridge edge formed at the end of the ramp so as to allow the passage of this heating element.

The invention as has just been described is not limited to the means and configurations exclusively described and illustrated, but also applies to all equivalent means or configurations and to any combination of such means or configurations. Similarly, although the invention has been described here according to embodiment variants that each separately implement one type of arrangement of the displacement reducing elements, it goes without saying that the different arrangements presented can be combined without having a negative effect on the invention.

The invention claimed is:

1. A frame for an electric heating device for heating an air flow circulating inside a ventilation, heating and/or air conditioning installation of a motor vehicle, said frame comprising:
    at least one housing configured to receive at least one heating element, the housing being delimited by a plurality of longitudinal walls forming a longitudinal insertion path for a heating element,
    wherein the insertion path is delimited longitudinally by an end wall that extends on an opposite side from an opening through which it is possible to insert the heating element, an insertion direction being defined from the opening to the end wall, and
    wherein at least one of the longitudinal walls of the housing comprises a displacement reducing element protruding from said wall, the displacement reducing element comprising:
        a ramp extending progressively toward an interior of the housing with respect to the insertion direction, toward the opposite longitudinal wall,
        at least one ridge that is arranged in a continuation of the ramp and forms an apex of the displacement reducing element, the at least one ridge being an innermost part of the displacement reducing element in the housing and extending in the insertion direction of the heating element in the housing, and
        a downstream end comprising a downstream face, the downstream face being configured to link the at least one ridge to the longitudinal wall.

2. The frame as claimed in claim 1, wherein the longitudinal wall comprises a plurality of displacement reducing elements.

3. The frame as claimed in claim 1, wherein the longitudinal walls defining the housing each comprise at least one displacement reducing element.

4. The frame as claimed in claim 1, wherein the displacement reducing element has an inclined surface forming the ramp, said inclined surface exhibiting an inclination angle with respect to the longitudinal wall on which the displacement reducing element is situated.

5. The frame as claimed in claim 1, wherein the downstream face extends substantially parallel to the end wall.

6. The frame as claimed in claim 1, wherein the displacement reducing element is in a zone defined between the end wall and a central part of the housing relative to its longitudinal dimension.

7. The frame as claimed in claim 1, wherein the displacement reducing element is integral with the longitudinal wall on which this displacement reducing element is situated.

8. The frame as claimed in claim 4, wherein the inclined surface has levels parallel to the longitudinal wall on which the displacement reducing element is situated.

9. An electric heating device comprising:
    at least one heating element; and
    a frame in which the at least one heating element is disposed, the frame comprising at least one housing configured to receive the at least one heating element, the housing being delimited by a plurality of longitudinal walls forming a longitudinal insertion path for a heating element, wherein the insertion path is delimited longitudinally by an end wall that extends on an opposite side from an opening through which heating element is inserted into the housing, an insertion direction being defined from the opening to the end wall, and wherein at least one of the longitudinal walls of the housing comprises a displacement reducing element protruding from said wall, the displacement reducing element comprising:

a ramp extending progressively toward an interior of the housing with respect to the insertion direction, toward the opposite longitudinal wall, at least one ridge that is arranged in a continuation of the ramp and forms an apex of the displacement reducing element, the at least one ridge being an innermost part of the displacement reducing element in the housing and extending in the insertion direction of the heating element in the housing, and a downstream end comprising a downstream face, the downstream face being configured to link the at least one ridge to the longitudinal wall.

* * * * *